(12) United States Patent
Fehr et al.

(10) Patent No.: US 8,839,941 B2
(45) Date of Patent: Sep. 23, 2014

(54) CONVEYOR HEAD AND TAIL DRIVE ROLLER SYSTEM

(75) Inventors: Tom Fehr, Paxton, IL (US); Paul Arthur Kaeb, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 159 days.

(21) Appl. No.: 13/594,250

(22) Filed: Aug. 24, 2012

(65) Prior Publication Data

US 2013/0220778 A1 Aug. 29, 2013

Related U.S. Application Data

(60) Provisional application No. 61/575,694, filed on Aug. 26, 2011.

(51) Int. Cl.
*B65G 21/10* (2006.01)
*B65G 23/36* (2006.01)
*B65G 23/44* (2006.01)
*B65G 15/00* (2006.01)

(52) U.S. Cl.
CPC ............... *B65G 15/00* (2013.01); *B65G 23/36* (2013.01); *B65G 23/44* (2013.01)
USPC ........................... 198/319; 198/313; 198/832

(58) Field of Classification Search
USPC .................. 198/832, 835, 313, 319, 588, 594
See application file for complete search history.

(56) References Cited

U.S. PATENT DOCUMENTS

| | | | | |
|---|---|---|---|---|
| 173,038 | A * | 2/1876 | Mitchell | 198/371.2 |
| 769,947 | A | 9/1904 | Kramer | |
| 2,444,521 | A * | 7/1948 | Mulkey et al. | 198/861.5 |
| 2,583,082 | A * | 1/1952 | Bobrowski | 198/319 |
| 2,601,916 | A * | 7/1952 | Bobrowski | 198/319 |
| 3,650,375 | A | 3/1972 | Fleischauer | |
| 5,060,786 | A * | 10/1991 | Demny | 198/867.01 |
| 5,452,791 | A | 9/1995 | Morency | |
| 7,093,707 | B2 * | 8/2006 | Matousek et al. | 198/668 |
| 8,317,013 | B2 * | 11/2012 | Sanders | 198/667 |
| 2003/0057055 | A1 * | 3/2003 | Haukaas et al. | 198/313 |

* cited by examiner

*Primary Examiner* — James R Bidwell
(74) *Attorney, Agent, or Firm* — Daniel J Coughlin; Bradley S. Strahm

(57) ABSTRACT

An incline conveyor that includes driven rollers at both the input (tail) end and the output (head) end of the conveyor that are powered by a single power source. Power is transmitted along the length of the conveyor with a driveline that distributes power to both the input and output drive rollers. The position of the drive rollers is adjustable to tension and track the conveyor belt. The position of the gearbox is also adjustable to maintain tension on the drive belt. The resulting conveyor drive mechanism allows cleated belt conveyors to be longer and transfer at higher capacities.

13 Claims, 6 Drawing Sheets

CONVEYOR HEAD AND TAIL DRIVE ROLLER SYSTEM

FIELD

This disclosure generally relates to a device for driving an uneven endless conveyor belt using powered drums at both the head and tail ends.

BACKGROUND

The drive mechanism for conventional incline conveyors generally involve drive pulleys and idler rollers in various configurations. Incline conveyors are commonly arranged such that the belt passes over two cylindrical rollers, one at the input (tail) end and the other at the output (head) end of the conveyor. Friction between the contact surface area of one or more powered drive rollers and the conveyor belt causes the endless belt to be driven.

A single-end drive pulley is commonly used to drive incline conveyors. Typically, the input roller is an idler roller; and the output roller is driven by a motor, and referred as the drive roller. Alternatively, the input roller could be driven and the output roller could be an idler. An example of an end drive conveyor is shown in U.S. Pat. No. 6,675,958 "Tube Conveyor" to Kaeb et al, the disclosure of which is incorporated by reference, which describes an endless belt incline conveyor driven from the input end or the output end.

Alternatively, an incline conveyor can have idler rollers at both the input and output ends and be driven by an S-drive roller mechanism located between the ends. An example of a center S-drive conveyor is shown in U.S. Pat. No. 5,452,791 "Dual Drive for Belt Conveyor" to Morency et al, which describes an endless belt conveyor driven by center positioned tandem drive rollers. The two driving rollers engage the belt in an S-shaped drive roller configuration. Other similar configurations utilize a single driven roller and a snub roller that properly positions the belt around the drive roller.

Proper conveyor belt tensioning is necessary to transfer power from the drive roller to the conveyor belt. Semi-elastic conveyor belts are generally installed around the end rollers, cut to length, and the belt ends are spliced together to form an endless conveyor belt. One or more end idler rollers are adjusted to stretch the semi-elastic conveyor belt around the end rollers. Generally, only the idler roller is adjustable since the drive roller is attached to the power source. For example, when the drive roller is moved, the power source must also be moved in order to maintain proper alignment of the power source components such as v-belts, gearboxes, and motors. Alternatively, snub rollers and S-shape roller configurations are used to apply tension to the conveyor belt.

However, certain types of substantially uneven conveyor belts, such as the cleated belt described in U.S. Pat. No. 6,170,646 to Kaeb et al, "Cleated Belt Adaptable to Curvilinear Shapes", the disclosure of which is incorporated by reference, interfere with rollers that contact the carrying surface of the cleated belt. As such, uneven conveyor belts cannot utilize snub rollers or drive rollers in an S-shape configuration for driving the belt or for tensioning.

As a result, incline conveyors with substantially uneven belts are generally powered by a single drive roller in the head or tail of the conveyor. These conveyors have limited drive roller surface area, which limits the amount of driving energy that can be transferred to the conveyor belt through friction between the roller and the belt. Therefore the length and capacity of the conveyor is limited. One solution is to increase the diameter of the drive roller, thus increasing the contact surface area. However, the use of larger diameter drive rollers requires the use of many other enlarged conveyor components, which leads to increases in the size, weight, and cost of the conveyor.

Longer conveyors also require greater conveyor belt uptake tensioning distances. Tensioning an uneven conveyor belt, such as a cleated belt, is generally accomplished by adjusting the position of the end idler roller relative to the end drive roller. The distance the end roller must be adjusted to maintain tension increases with conveyor length. Tensioning bolts are utilized on either side of the end idler roller to stretch the semi-elastic conveyor belt to the predetermined degree of tension.

Therefore it is apparent that there are numerous challenges in to using existing solutions to drive and tension a long, high capacity conveyor with a substantially uneven conveyor belt surface. Another limitation is the inability to properly tension the conveyor belt using adjustable end rollers when the end roller is driven, when the end roller is a driven roller that needs to maintain proper tension with a gear box through a drive belt. Existing solutions to drive and tension long conveyor belts rely on multiple independent power sources to drive the input and the output drive rollers.

SUMMARY

It is therefore an object of the present invention to provide a conveyor that overcomes some or all of the problems associate with existing conveyor systems. For example, some advantages of the present invention include an apparatus which provides:

a. increased drive capacity for conveyors utilizing substantially uneven conveyor belt carrying surfaces, such as cleated belts;

b. a conveyor in which a single power source transmits power to both the head and the tail drive rollers;

c. a conveyor in which the two disparate drive rollers maintain the same roller surface speed;

d. a conveyor in which the gearbox is adjustably positioned in order to maintain tension on the drive belt that connects the gearbox with the adjustably positioned drive roller;

e. a conveyor in which the conveyor belt tension is adjustably maintained with adjustable rollers at both the input and output ends of the conveyor.

Accordingly, one aspect of the invention includes a conveyor with drive rollers at the input and output ends that are driven by a common power source. The power source can be, but is not limited to, power takeoff (PTO), electric, hydraulic, or a gas engine. The power source is connected to a driveline that powers gearboxes at the input and output end of the conveyor. The gearboxes transfer power to the respective drive roller through a belt connection. The gearbox, pulleys, and drive roller are configured such that the surface speed of the pair of drive rollers is maintained at the same rate.

In another aspect of the invention, the increased drive capacity can be utilized with an incline conveyor with a substantially uneven belt to produce a high capacity conveyor that operates at greater lengths than existing cleated belt incline conveyors. The substantially uneven belt, such as a cleated belt conveyor, would otherwise interfere with the use of an S-drive configuration or a snub roller. The conveyor can be a tube conveyor. Incline tube conveyor transport lengths utilizing this technology can exceed 80 or 115 feet.

In another aspect of the invention, the conveyor maintains proper tension on the conveyor belt by adjustably positioning both rollers at the input and output ends of the conveyor.

Given the elastic nature of conveyor belts commonly used, the conveyor belt is installed and then placed under tension in order to provide sufficient traction between the conveyor belt and the drive wheels. Longer conveyor lengths require a greater amount of tensioning. Tensioning bolts are connected to the frame of the conveyor and to the ball bearing mount on the end roller. The cleated conveyor belt is initially tensioned to a determined level at one end. In a preferred embodiment, the output end is first tensioned. As the belt stretches, additional tensioning is required to maintain proper conveyor belt tension. Maintenance tensioning of the conveyor belt is applied at the opposite end of the initial tensioning.

In another aspect of the invention, the gearbox is adjustably positioned in order to maintain proper drive belt tension between the gearbox and the adjustable drive roller. The gearbox is attached to an adjustment plate and a tensioning bolt to properly position the gearbox once the cleated belt conveyor has been properly tensioned.

In another aspect of the invention, a telescoping driveline is utilized to connect the adjustable gearbox with the fixed driveline. The driveline connects the input gearbox and output gearbox with the power source.

BRIEF DESCRIPTION OF DRAWINGS

Aspects are illustrated by way of example, and not by way of limitation, in the accompanying drawings, wherein.

DETAILED DESCRIPTION

Figure 1:
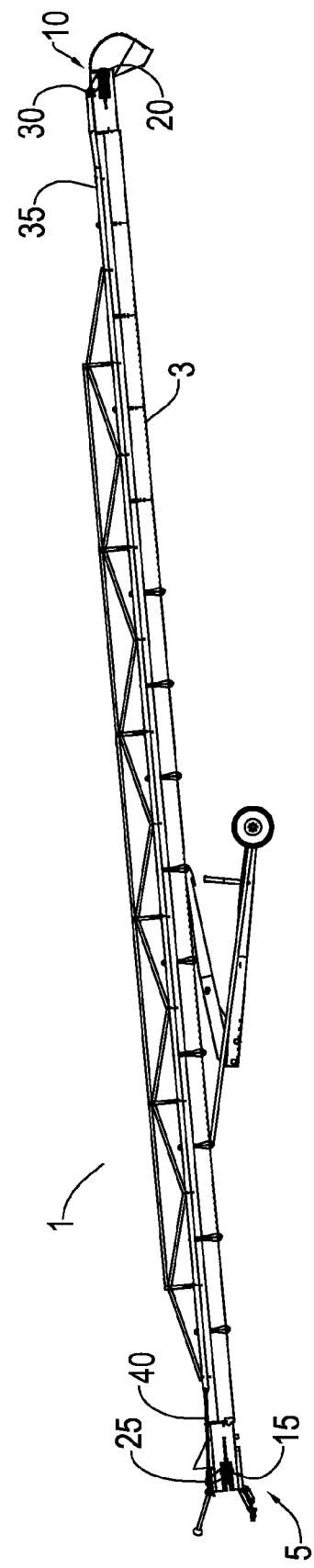
FIG. 1 is a side perspective view of the full length of the conveyor showing the two drive ends.

Referring now to the invention in more detail, in FIG. 1 there is shown a conveyor 1 with a conveyor frame 3, an input end 5, and an output end 10. The input end 5 has an input drive roller 15 and an input gearbox 25. The output end 10 has an output drive roller 20 and an output gearbox 30. A fixed driveline 35 and a telescoping driveline 40 extend parallel to the conveyor frame 3.

Figure 2:
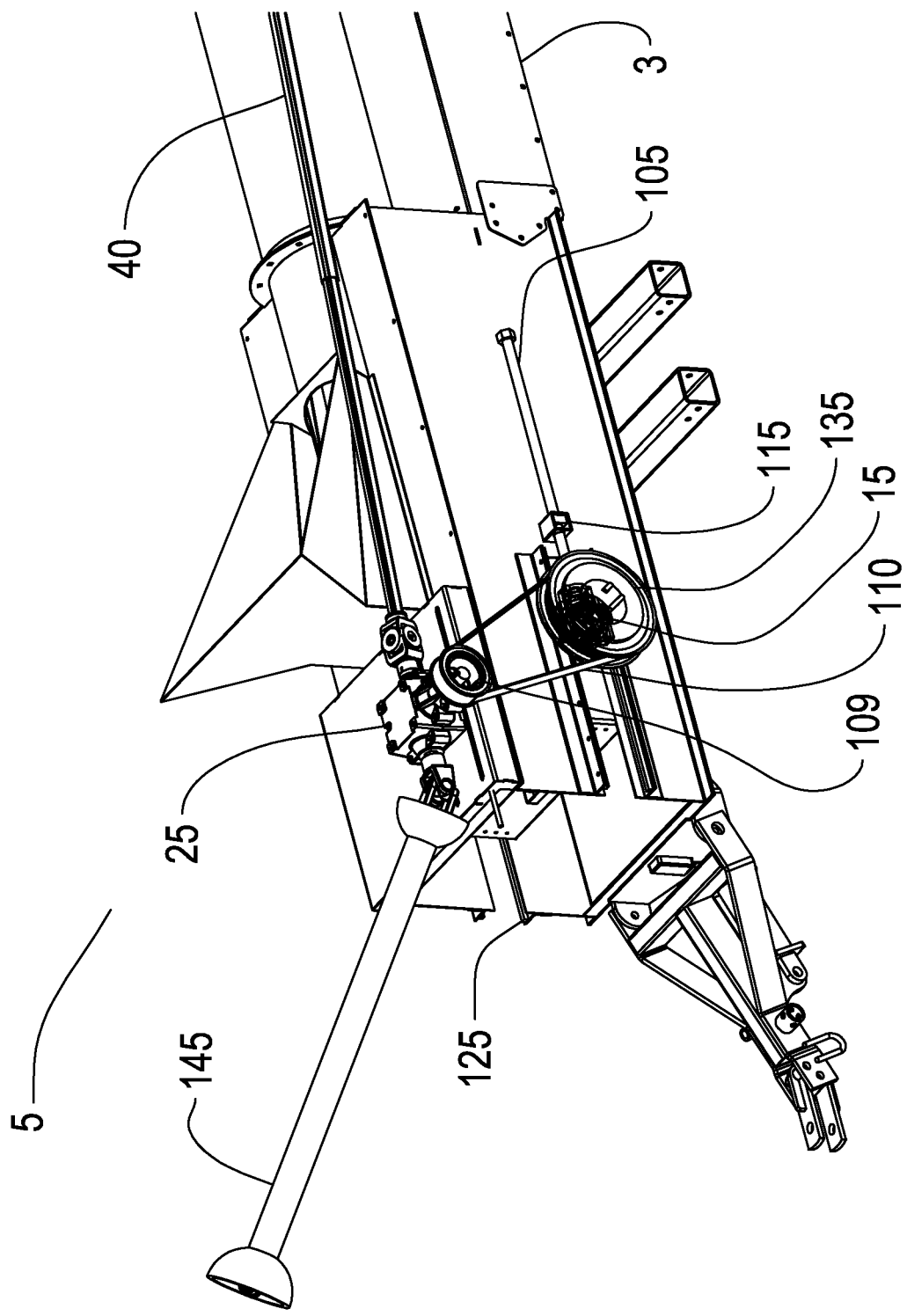
FIG. 2 is a top, side perspective view of the input (tail) end of the conveyor showing the input drive mechanism.

In FIG. 2 there is shown a detail view of the input end 5 of the device. The input gearbox 25 is slidably mounted to the conveyor frame 3. The input gearbox 25 is operably connected to the telescoping driveline 40. The telescoping driveline 40 extends and retracts parallel to the length of the conveyor to compensate for the variable position of the input gearbox 25.

An input drive pulley 109 operably receives the input gearbox 25. The input drive pulley 109 is operably connected to the input drive roller pulley 135 with a belt drive 110. The input drive roller pulley 135 operably receives the input drive roller 15. The input drive roller 15 is slidably mounted within a drive roller slot 125 at the input end 5 of the conveyor frame 3. A tensioning bolt 105 is an externally threaded bolt or stud that is threadably received within the tensioning bracket 115. Threadably extending or retracting the tensioning bolt 105 causes the input drive roller 15 to slide within the drive roller slot 125.

Figure 3:
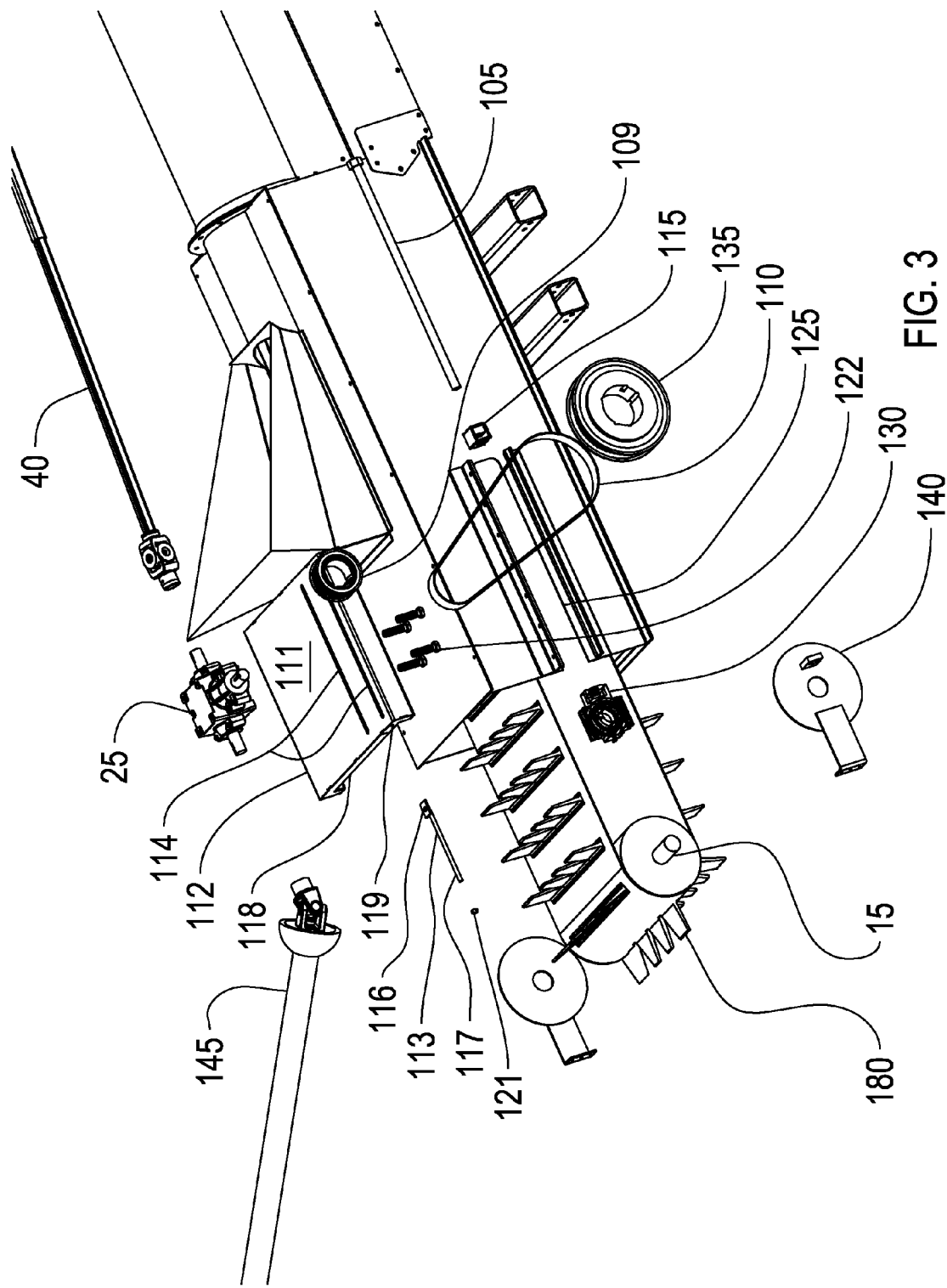
FIG. 3 is an exploded view of the input end of the conveyor, showing the assembly of the input drive mechanism.

In FIG. 3, there is shown the gearbox 25. The gearbox 25 is slidably mounted to the top surface 111 of a base 112. The base 112 has one or more slots 114 disposed parallel to the length of the conveyor. The gearbox is slidably mounted to the base with two or more gearbox mounting bolts 122, such as four carriage bolts as depicted, that are received by the gearbox and pass through the slots 114. The gearbox-tensioner 113 has a first tensioner end 116 that is configured to threadably receive one or more of the gearbox mounting bolts. The gearbox-tensioner 113 has a second tensioner end 117 that is externally threaded. The base 112 has a front surface 118. The front surface 118 is configured with an opening 119 to receive the second tensioner end 117 of the gearbox tensioner 113. The second tensioner end 117 passes through the opening 119 and is threadably received by a nut 121. The gear box 25 is adjusted by threadably rotating the nut 121 such that the gearbox-tensioner 113 moves inwardly or outwardly with respect to the opening 119. Movement of the gearbox-tensioner 113 causes the gearbox 25 to slide forward or backward along the slots 114 of the base 112.

The input drive roller 15 is operably received by an input ball bearing unit 130 on either end. The input drive roller 15 is received by a pair of drive roller end plates 140 on either end. A pair of drive roller slots 125 is disposed within the lateral sides of the input end 5 of the conveyor. Each drive roller slot 125 is configured to slidably receive the respective drive roller end plates 140. An input drive roller pulley 135 operably receives the input drive roller 15 such that the rotating the input drive roller pulley 135 causes the input drive roller 15 to rotate.

The tensioning bolt 105 is laterally disposed against the input ball bearing unit 130. The tension of the conveyor belt 180 is adjusted by threadably rotating the tensioning bolt 105 inwardly or outwardly with respect to the tensioning bracket 115. The tensioning bolt 105 presses against the input ball bearing mount 130 with varying pressure. The device utilizes a second parallel tensioning bolt to effectuate even pressure on both ends of the input drive roller 15 so that the tension and tracking of the conveyor belt is maintained.

The configuration of the input gearbox 25 can either be a through shaft gearbox or a right angle gearbox depending on whether the power source is electric, power takeoff (PTO), hydraulic, or a gas engine. A PTO shaft 145 connected to a right angle gearbox. The PTO is operably connected to the input gearbox 25 and the input drive pulley 109. Power is transferred through the telescoping driveline 40, to the fixed driveline 35, and to the output gearbox 205.

Figure 4:
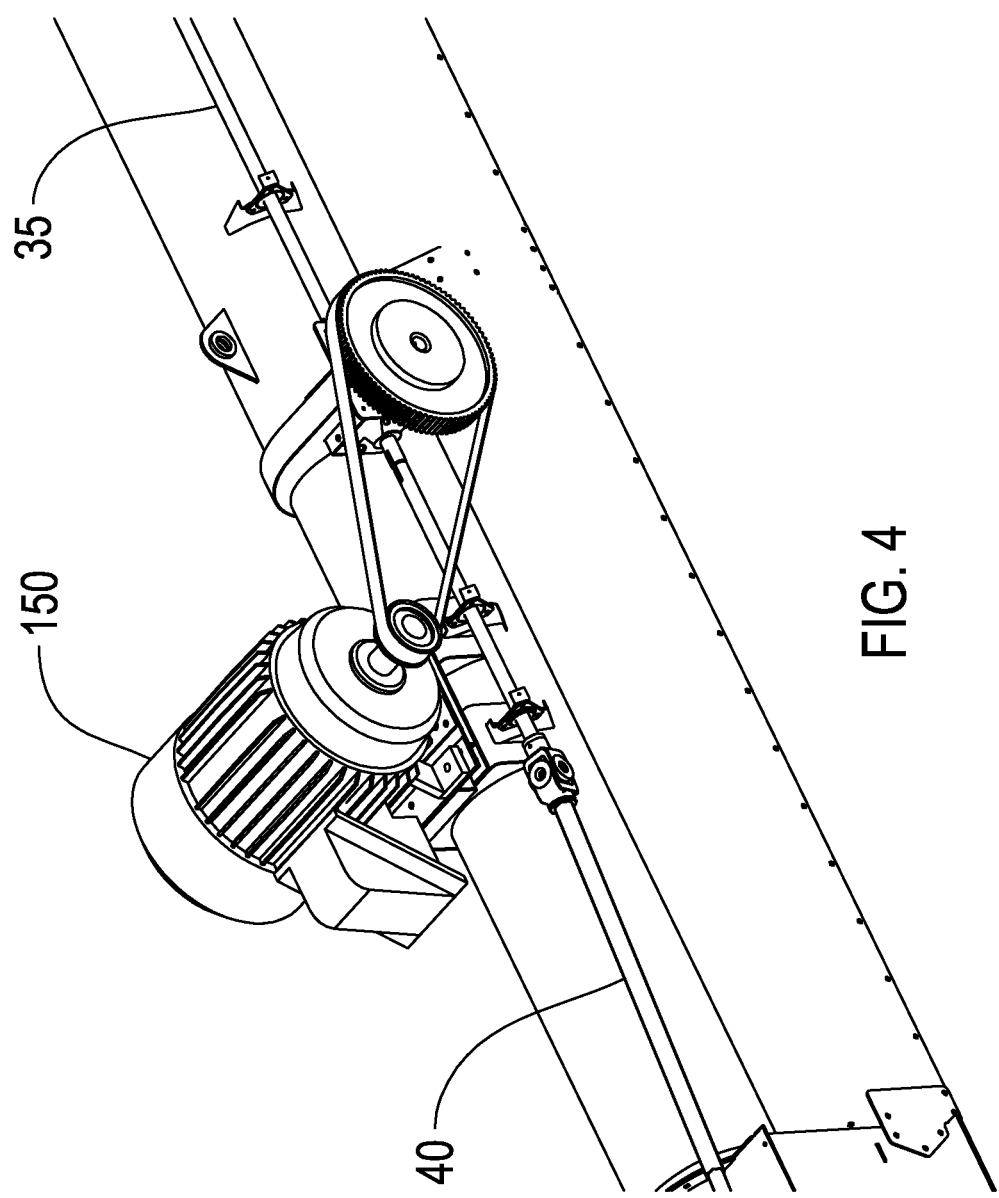
FIG. 4 is a top, side perspective view of an electric motor power source that is connected to the drive line.

In FIG. 4, there is shown an electric motor that provides power from between the two drive rollers. There is shown an electric motor 150. The electric motor is operably connected to the fixed driveline 35. Power is transferred through the fixed driveline 35 to the output gearbox 205 and through the telescoping driveline 40 to the input gearbox 25.

Figure 5:
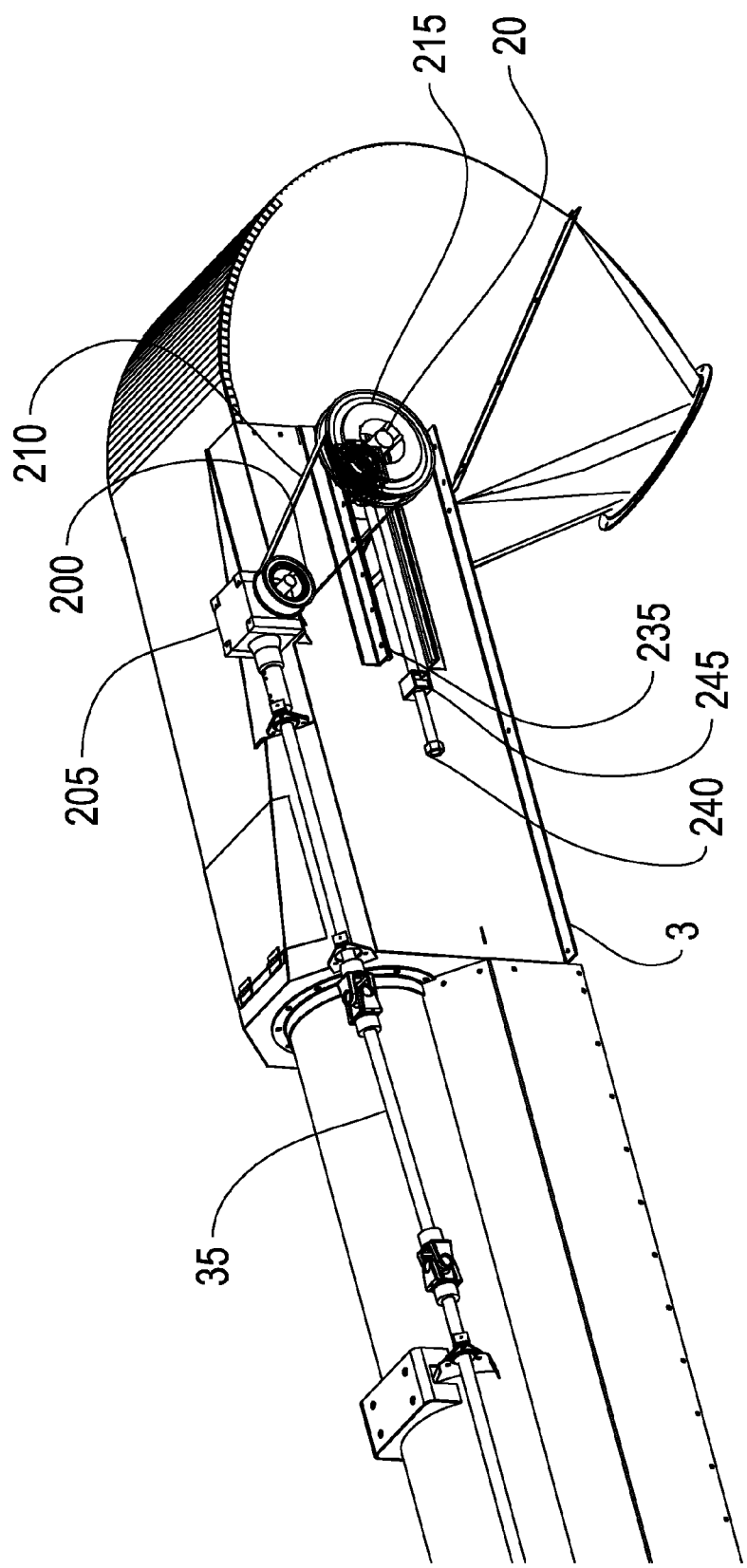
FIG. 5 is a top, side perspective view of the output (head) end of the conveyor showing the output drive mechanism.

In FIG. 5, there is shown the fixed driveline 35 operably connected to the output gearbox 205. The output gearbox 205 is securely mounted to the conveyor frame 3 with one or more bolts or by welding. An output drive pulley 200 operably receives the output gearbox 205. The output drive pulley 200 is operably connected to the output drive roller pulley 215 with a belt drive 210. The output drive roller pulley 215 operably receives the output drive roller 20. The output drive roller 20 is slidably mounted within an output drive roller slot 235 at the output end 10 of the conveyor 1. An output-tensioning bolt 240 is an externally threaded bolt or stud that is threadably received within the output-tensioning bracket 245. Threadably extending or retracting the output-tensioning bolt 240 causes the output drive roller 20 to slide forward and or backward within the output drive roller slot 235. The output gearbox 205 is mounted at a pre-determined location so as to place the appropriate amount of tension on the output belt drive 210 when the output drive roller 20 is properly positioned by the output-tensioning bolt 240.

Figure 6:
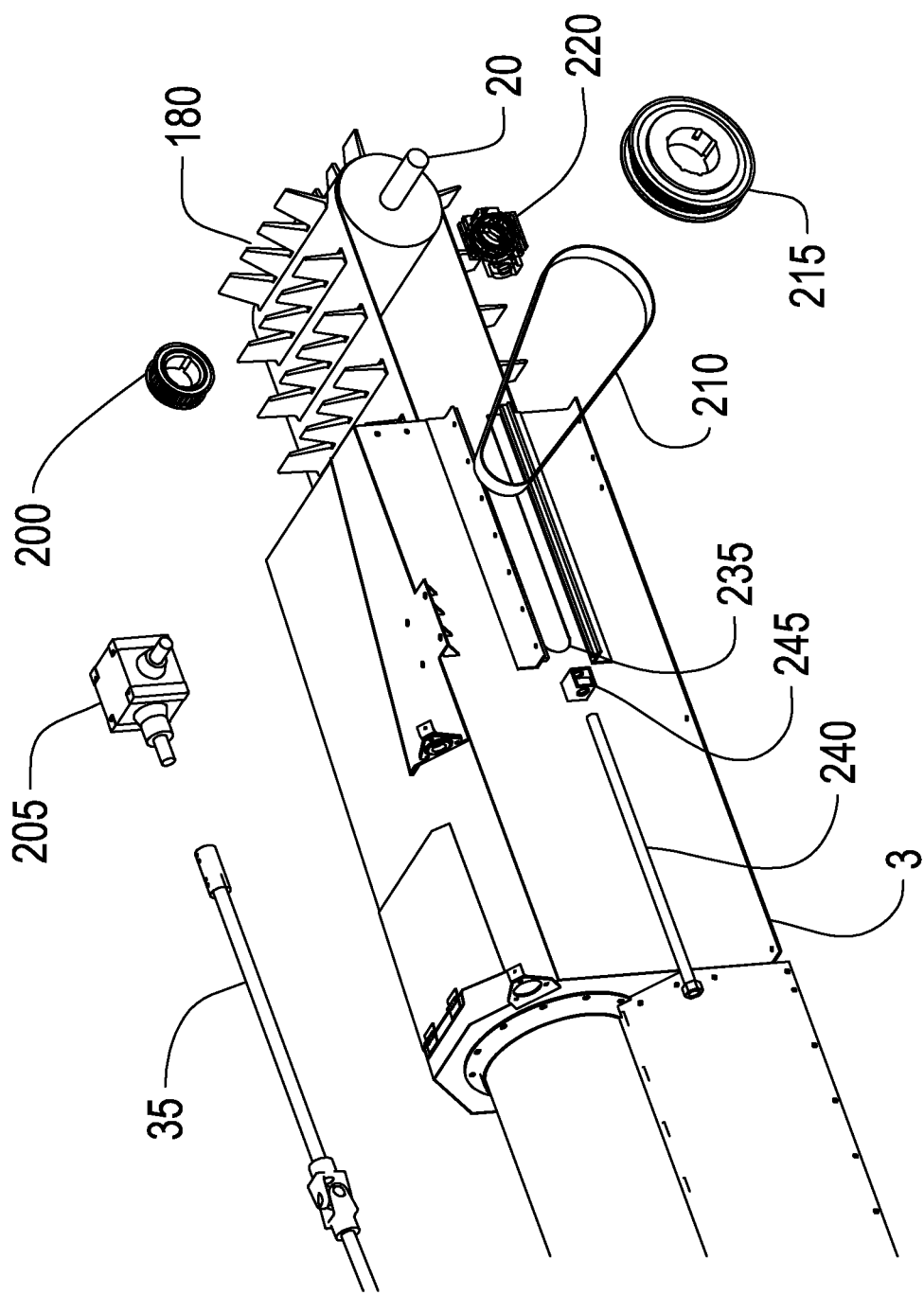
FIG. 6 is an exploded view of the output end of the conveyor, showing the assembly of the output drive mechanism.

In FIG. 6, there is shown the output drive roller 20. The output drive roller 20 is operably received by a plurality of output ball bearing units 220 on either end of the output drive roller 215. A pair of output drive roller slots 235 is disposed within the lateral sides of the output end 10 of the conveyor. Each drive roller slot 235 is configured to slidably receive the respective output ball bearing unit 220. An output drive roller pulley 215 operably receives the output drive roller 20 such that the rotating the output drive roller pulley 215 causes the output drive roller 20 to rotate.

The output-tensioning bolt 240 is laterally disposed against the output ball bearing unit 220. The tension of the conveyor belt 180 is adjusted by threadably rotating the output-tensioning bolt 240 inwardly or outwardly with respect to the output-tensioning bracket 245. The output-tensioning bolt 240 presses against the output ball bearing mount 220 with varying pressure. The device utilizes a second parallel output-tensioning bolt to effectuate even pressure on both ends of the output drive roller 20 so that the tension and tracking of the conveyor belt is maintained.

What is claimed is:

1. An incline conveyor having an input end and an output end, comprising:
    a. a first gearbox that is operably connected to a first driven roller with a first drive belt, where said first gearbox and said first driven roller are mounted at the input end of the conveyor;
    b. a second gearbox that is operably connected to a second driven roller, where said second gearbox and said second driven roller are mounted at the output end of the conveyor;
    c. an endless conveyor belt extending about said first driven roller and said second driven roller;
    d. means for providing power to the conveyor;
    e. a driveline that operably connects said means for driving the conveyor with said first driven roller and said second driven roller;
    f. wherein said first driven roller and said second driven roller are slidably mounted in order to maintain tension on said endless conveyor belt by adjusting the position of said first driven roller and said second driven roller.

2. The apparatus of claim 1, wherein said first gearbox is slidably mounted in order to maintain tension on the respective said first drive belt when the position of said first driven roller is adjusted.

3. The apparatus of claim 2, wherein said driveline includes a fixed driveline portion and a telescoping driveline portion, whereby said telescoping driveline portion can be extended or retracted to accommodate the adjustable position of said first gearbox.

4. The apparatus of claim 2, wherein said endless conveyor belt has a carrying surface that is substantially uneven.

5. A cleated belt incline conveyor comprising:
    a. a first driven roller disposed at the input end of the conveyor;
    b. a second driven roller disposed at the output end of the conveyor;
    c. an endless conveyor belt extending about said first driven roller and said second driven roller;
    d. means for providing power to the conveyor;
    e. means for transferring power comprising a first drive belt that operably connects said means for providing power to the conveyor with said first driven roller and a second drive belt that operably connects said means for providing power to the conveyor with said second driven roller;
    f. wherein said first driven roller and said second driven roller are slidably mounted in order to maintain tension on said endless conveyor belt by adjusting the position of said first driven roller and said second driven roller.

6. The apparatus of claim 5, wherein said means for transferring power is slidably mounted in order to maintain tension on the respective said first drive belt when the position of said first driven roller is adjusted.

7. The apparatus of claim 6, wherein said driveline includes a fixed driveline portion and a telescoping driveline portion, whereby said telescoping driveline portion can be extended or retracted to accommodate the adjustable position of said means for transferring power.

8. The apparatus of claim 6, wherein said endless conveyor belt has a carrying surface that is substantially uneven.

9. The apparatus of claim 6, wherein said means for transferring power is slidably mounted in order to maintain tension on the respective said second drive belt when the position of said second driven roller is adjusted.

10. An incline conveyor having an input end and an output end, comprising:
    a. a first gearbox that is operably connected to a first driven roller with a first drive belt, where said first gearbox and said first driven roller are mounted at the input end of the conveyor;
    b. a second gearbox that is operably connected to a second driven roller, where said second gearbox and said second driven roller are mounted at the output end of the conveyor;
    c. an endless conveyor belt extending about said first driven roller and said second driven roller, where said endless conveyor belt has a bottom surface that contacts said first driven roller and said second driven roller, and where said endless conveyor belt has a top surface and a plurality of cleats attached to the top surface;
    d. wherein said first driven roller and said second driven roller are slidably mounted in order to maintain tension on said endless conveyor belt by adjusting the position of said first driven roller and said second driven roller;
    e. means for providing power to the conveyor; and
    f. a driveline that operably connects said means for driving the conveyor with said first driven roller and said second driven roller.

11. The apparatus of claim 10, wherein said first gearbox is slidably mounted in order to maintain tension on the respective said first drive belt when the position of said first driven roller is adjusted.

12. The apparatus of claim 11, wherein said driveline includes a fixed driveline portion and a telescoping driveline portion, whereby said telescoping driveline portion can be extended or retracted to accommodate the adjustable position of said first gearbox.

13. The apparatus of claim 12, wherein said second gearbox is operably connected to said second driven roller with a second drive belt, and said second gearbox is slidably mounted in order to maintain tension on the respective said second drive belt when the position of said second driven roller is adjusted.

* * * * *